Nov. 21, 1933.  H. E. TWOMLEY  1,935,734
EXTENSIBLE CONVEYER
Filed April 6, 1932  3 Sheets-Sheet 1

Inventor
Herbert E. Twomley
By Lyon & Lyon
Attorneys

Nov. 21, 1933.   H. E. TWOMLEY   1,935,734
EXTENSIBLE CONVEYER
Filed April 6, 1932   3 Sheets-Sheet 2
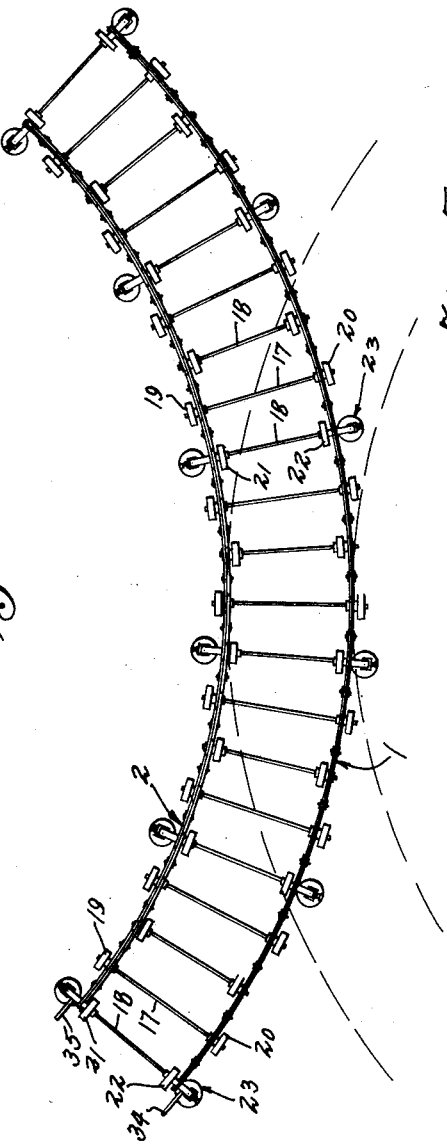
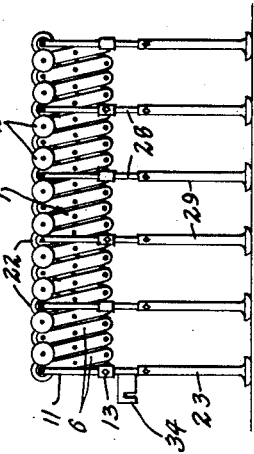
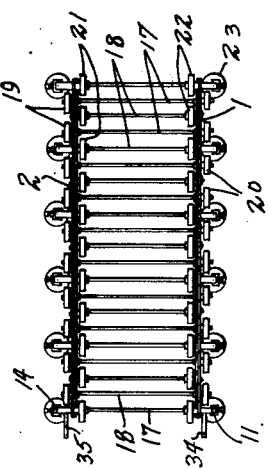
Inventor
Herbert E. Twomley
By Lyon & Lyon
Attorneys

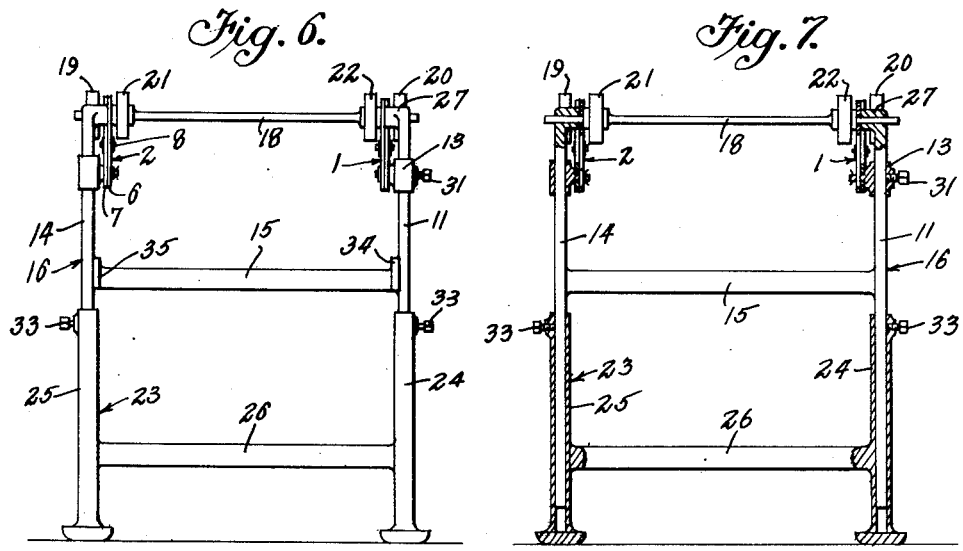
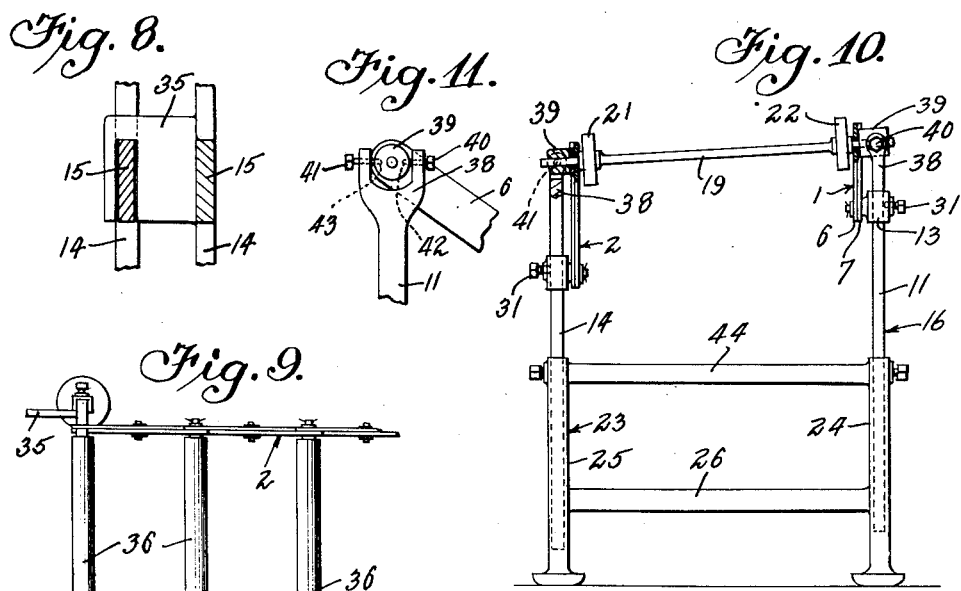

Patented Nov. 21, 1933

1,935,734

UNITED STATES PATENT OFFICE 1,935,734

EXTENSIBLE CONVEYER

Herbert E. Twomley, Riverside, Calif., assignor to Clara B. Parker, Riverside, Calif., as executrix of the estate of George D. Parker, deceased Application April 6, 1932. Serial No. 603,529

3 Claims. (Cl. 193—35)

My invention relates to conveyers, which may be employed for transporting parcels, and has particular reference to a conveyer which may be contracted into a relatively small compass or extended to adapt itself to varying space conditions desired to be traversed by the parcels.

In transporting boxes or parcels in various industries, it frequently occurs that the fixed type of conveyer is not adapted for the particular work in hand, due to the fact that by reason of the conveyer being fixed it is necessary to manually transport the parcels or boxes from that part of the conveyer nearest the point at which the parcels are to be used. For example, in the loading of parcels into a storage warehouse or a car it is desirable that the parcels should be transported initially to the furthermost point at which the parcels are to be stacked or stored while, as the storage space is filled, it is desirable that the parcels shall be delivered at a less distant point.

It is, therefore, an object of this invention to provide a conveyer which may be constructed to be contracted and extended to lengthen or shorten the extent of the conveyer to adapt it for transportation of parcels over short or great distances.

Another object of the invention is to provide a conveyer which may be contracted into a relatively small compass for storage, or which may be extended to considerable length when in operation.

Another object of the invention is to provide an extensible conveyer which is also flexible, permitting the extension of the conveyer around curves.

Another object of the invention is to provide an extensible conveyer of the character set forth in the preceding paragraph, in which the conveyer is provided with a plurality of parcel supporting rollers which, when the conveyer is curved, will be automatically aligned along the curve to guide the parcels around the curve.

Another object of the invention is to provide an extensible conveyer which, when positioned in any desired curved path, will automatically align abutting rollers thereof with radii of the circle formed by the curved conveyer.

Another object of the invention is to provide an extensible conveyer, as set forth in the preceding paragraph, in which the alignment of the rollers along radii of the curve will occur irrespective of the amount to which the conveyer is extended.

Another object of the invention is to provide a conveyer which may be constructed in sections, each of which is flexible and extensible so that a conveyer of any desired length and curvature may be constructed from a plurality of such sections.

Another object of the invention is to provide a conveyer of the type set forth in the preceding paragraph, in which each of the sections may be readily detached from the next section to permit ready shortening of the conveyer, not only by contracting any particular section, but also by bodily removing one or more of the sections.

Another object of the invention is to provide a flexible conveyer which is rigid in a vertical direction to provide ample support for parcels which may be passed thereover, and in which the conveyer may be contracted into a relatively short length or extended to a great length.

Other objects and advantages will be apparent from a study of the following specifications read in connection with the accompanying drawings, wherein Figure 1 is a top plan view of a conveyer constructed in accordance with my invention, illustrating the same in its most extended position;

Figure 3 is a top plan view of the conveyer shown in Figure 1, illustrating the conveyer as being in a curved position;

Figure 4 is a top plan view of the conveyer shown in Figure 1, in contracted position;

Figure 5 is a side elevational view of the conveyer in contracted position;

Figure 6 is an end elevational view of the conveyer shown in Figures 1 to 5;

Figure 7 is a detail sectional view, taken along line VII—VII of Figure 2;

Figure 8 is a detail sectional view, taken along line VIII—VIII of Figure 1, illustrating the method of attaching several sections of the conveyer together;

Figure 9 is a top plan view of a conveyer constructed in accordance with my invention, but showing a modified form of roller which may be employed;

Figure 10 is a detail, end view, partly in section, illustrating the manner of mounting the axles of the rollers, permitting angular adjustment thereof for "banking" the conveyer around curves formed thereby; and Figure 11 is a detail side elevational view of one of the mounting members illustrated in Figure 10.

Figure 1:
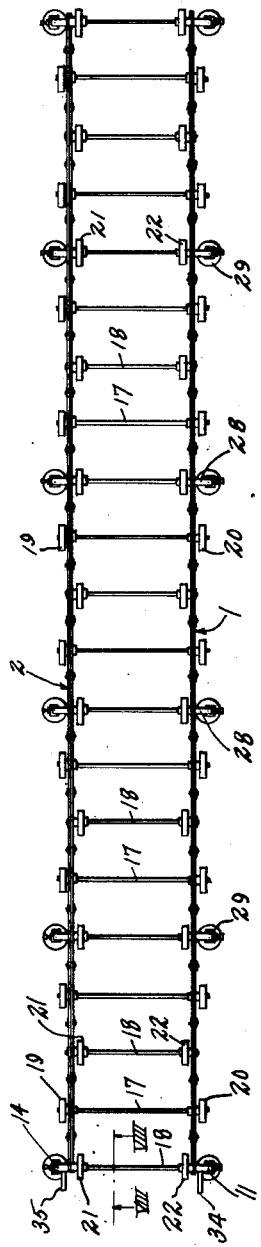

Referring to the drawings, I have illustrated a conveyer unit as comprising a pair of longitudinal joists 1 and 2, each of said joists being formed of a plurality of crossed links in the arrangement known in the art as a "lazy tong". That is, each joist is formed of a plurality of adjacent sections 3, 4, 5 etc., each of the sections being formed of a pair of crossed links 6 and 7 pivotally interconnected at the centers 8 of the links, as by means of rivets or bolts. Each of the links is formed from a thin strip of steel or other resilient material and is relatively wide so that it is flexible in the direction of its thickness but rigid in the direction of its width. The ends of the links 6 and 7 forming one section are pivotally connected to the ends of the links 6 and 7 forming the adjacent section, so as to form upper points 9 and lower points 10. The joist 5 is illustrated as being mounted in a vertical plane upon a post 11, the post being pivotally connected to the outer end of the link 6, as is illustrated at 12, while the outer end of the link 7 is formed with a slide 13 surrounding the post 11, permitting extension and contraction of the lazy tong but holding the lazy tong rigid in the vertical direction.

The joist 2 is similarly constructed and is similarly connected to a supporting post 14, the posts 11 and 14 constituting vertically extending legs interconnected by means of a cross brace 15 to form a supporting frame 16 which maintains the joists 1 and 2 in spaced parallel relation.

A plurality of axles 17 and 18 are illustrated as extending laterally across the joists 1 and 2, these axles constituting the mounting axes for parcel engaging rollers. The axle 17 is illustrated as being journaled upon the joists 1 and 2 preferably by passing the axles through the pivots of the upper points of the lazy tong construction. The axle 17 is illustrated as bearing upon its outer ends a pair of parcel engaging rollers 19 and 20, these rollers lying exteriorly of the joists 1 and 2. The axle 18 is illustrated as being shorter than the axle 17 and it also is journaled at the points of the lazy tong forming the joists 1 and 2. The rollers 21 and 22, associated with the axle 18, are illustrated as lying within the space defined by the joists 1 and 2. The purpose of this construction is to permit the more complete contraction of the conveyer, as is illustrated in Figures 4 and 5, without interference with the rotation of the rollers 19—20—21—22, since when the conveyer is in the contracted position alternate rollers on one side of the conveyer will be on opposite sides of the adjacent joists, thus providing ample space between the adjacent rollers to permit their ready rotation even though the conveyer is contracted into a relatively small compass.

The end frame 16 is illustrated as being adjustably supported in a foot piece 23 preferably formed of a pair of hollow legs 24 and 25 for receiving the posts 11 and 14, respectively, in telescopical assembly therewith, so that the frame 15 may be vertically adjusted upon the legs to any desired height. A suitable cross brace 26 is illustrated as extending between the opposed legs 24 and 25 so as to insure rigidity of construction of the frame.

It will be observed from an inspection of Figures 6 and 7 that the upper ends of the posts 11 and 14 are enlarged, as is indicated at 27, to form a journaled bearing through which the axle 18 at the end of the conveyer may pass so that the axle constitutes not only a connection between the joists and the axle, but also constitutes a connection between the joists and the supporting posts.

If desired, a plurality of additional supports may be employed, spaced along the joists 1 and 2 to assist in lending rigidity in a vertical direction to the conveyer. I have illustrated one of such auxiliary supports as being attached at every fourth axle along the length of the conveyer, these additional supports comprising a frame 28 which is in all respects identical with the frame 16 and may be mounted in a suitable foot frame 29 similar in all respects to the foot frame 23.

The lower point of the lazy tong adjacent the frame 28 is secured to a slide 30 similar to slide 13 arranged to reciprocate upon the supporting posts of the frame in the same manner as was described with referenec to the supporting posts 11 and 14.

Figure 2:
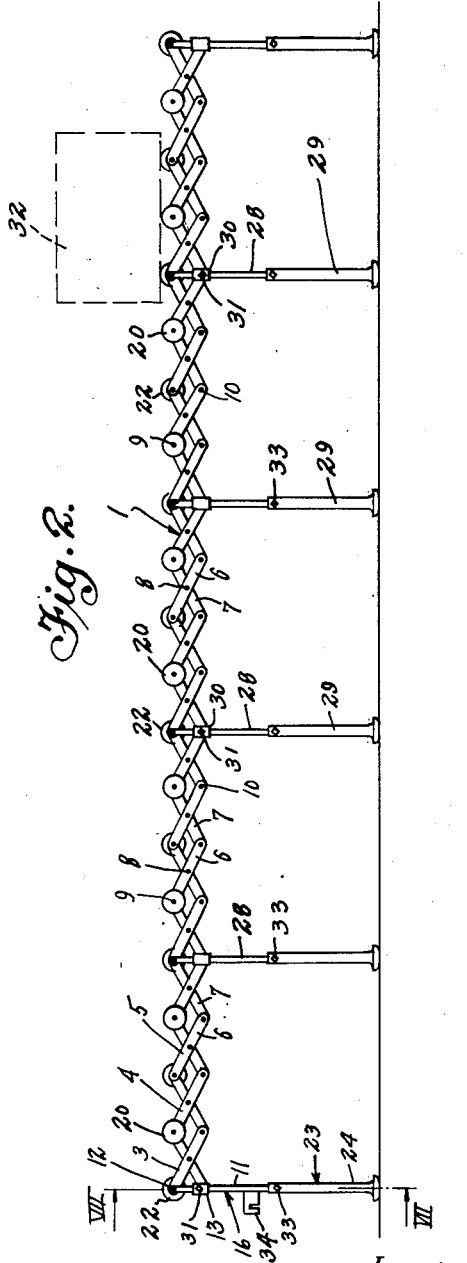
Figure 2 is a side elevational view of the conveyer shown in Figure 1.

It will be observed from an inspection of Figures 2 and 5 that when the conveyer is in all of its extended positions, or in its contracted position, the lazy tong arrangement of the links 6 and 7 will insure that the axles secured thereto will be spaced at equal intervals throughout the length of the conveyer. By providing a set screw 31 upon one or more of the slides 13 and 30 to engage the supporting posts upon which the associated slides operate, the lazy tong may be locked in any position to which it may be moved and when so locked will form a construction which is rigid in a longitudinal direction as well as a structure which is rigid in a vertical direction.

With the construction set forth, the conveyer may be contracted into the position shown in Figures 4 and 5, constituting a relatively short conveyer section over which the parcels 32 to be transported may pass. If the place to which the parcels are to be transported lies at a more distant point, the conveyer may be extended to any desired length until the adjacent links forming the lazy tong are substantially aligned with each other.

For example, a conveyer may be constructed to occupy a space when contracted of approximately 24 inches, and may be extended to as great a length as 9 feet. This extensible feature of the conveyer permits its use in loading or stacking parcels or boxes in railroad cars, warehouses, and the like, in which at the beginning of the loading the conveyer may be extended to its greatest length and thereby deliver parcels to the farthermost point at which the stacking is to begin. As the stack grows, the conveyer may be pushed back into a varying number of contracted positions, so that delivery of the parcels to the exact point at which they are to be stacked may be accomplished as the stack of parcels is built up.

Another feature of the construction of my conveyer is that not only is it extensible, but it is adapted to be bent around curves or corners to deliver the parcels to any one of a number of positions out of axial alignment with the entrance end of the conveyer.

By reason of the construction of the two joists 1 and 2, each link of which being made of flat more or less thin flexible spring steel or other flexible material which is flexible in a lateral direction and rigid in a vertical direction and each of which is formed as a lazy tong, is extensible independent of the other, there being no rigid interconnection between the two joists requiring that both of them shall be extended to the same length. Thus, as is illustrated in Figure 3, the conveyer may be bent around a considerable curve, the joist 1 being extended to a greater length than the joist 2 is extended to form the two arcs of the curve formed by the joists, which by reason of their construction are flexible in a lateral direction but very rigid in a vertical direction.

However, due to the fact that the axles are mounted at equal points on the lazy tong, when the tong is extended or contracted they will always be uniformly spaced along the length of the tong, and the rollers adjacent the joist 1 will be evenly spaced throughout the length of the joists, while, similarly, the rollers adjacent the joist 2 will be spaced evenly along the length of the joist 2. With this arrangement, the axles 17—18 are automatically aligned with radii of the circle formed by the curve to which the conveyer is bent. Thus parcels placed upon the conveyer will automatically travel truly around the curve, it being unnecessary to provide guides or tracks to cause the parcels to accurately follow the curve.

With the arrangement of the supporting frames telescopically adjustable relative to the supporting foot frames, the opposite ends of the conveyer may be arranged at different levels to form a gravity conveyer, permitting the parcels to travel over the entire device by gravity. This is readily accomplished by drawing the supporting frame 16 at one end of the conveyer upwardly relative to its foot frame 23 and locking the same at any desired level by means of set screws 33. The supporting frame at the opposite end of the conveyer may be adjusted at a suitable lower level to provide a greater grade to the entire conveyer. The intermediate foot frames 29 may also be suitably adjusted to conform with the desired incline of the conveyer.

A plurality of conveyer sections, such as that illustrated in Figures 1 to 7, may be employed to construct a long conveyer, these sections being attached in alignment with remaining sections so that the entire assembly may be brought out to a desired extended position, or may be contracted, to lengthen and shorten the conveyer system to adapt it to varying points to which parcels are to be delivered. A ready means for attaching adjacent sections of the conveyer may be provided by securing a plurality of longitudinally extending lugs 34 and 35 to the cross bar 15, each being formed with a hook-like configuration adapted to hook over the cross bar 15 of the end section of an adjacent section of the conveyer. Preferably the lugs 34 and 35 are mounted along the inner edge of the adjacent supporting posts 11 and 14 so that when the lugs are in place upon the cross bar of the adjacent section of the conveyer, the side of the lugs 34 and 35 will bear against the supporting posts 11 and 14 of the adjacent section of the conveyer, and thus prevent any lateral displacement of one of the conveyer sections relative to the other.

While I have illustrated the rollers 19—20—21—22 as being small rollers mounted near the ends of their associated axles, it will be apparent that other forms of rollers might be employed. For example, a solid cylindrical roller may be used, as is indicated in Figure 9, each of these rollers comprising a cylindrical member 36 extending laterally of the space between the joists 1 and 2. Again the axles or axes 37 upon which the rollers 36 are mounted are attached as was described with reference to the axles 17 and 18 to the upper points of the lazy tong arrangement for each of the joists.

While the fact that the extension of the joists 1 and 2, irrespective of the curves to which they may be bent, insures that the axles will be so aligned with each other as to cause parcels 32 to accurately follow the curve, it may be found desirable to "bank" the conveyer, particularly when the grade to which the conveyer may be set is such as to cause the packages to travel at high speed around the curve. For this purpose the construction of the posts 11 and 14 may be as is illustrated in Figure 10, in which each of the posts is formed with a bifurcated upper end 38 within which may be received a cylindrical bearing 39 constituting the bearing for the axle 18. The bearing 39 is attached to the post end by means of a pair of trunnion bearings 40, 41, respectively, receivable in radial recesses 42 and 43 in the bearings 39. With this construction, one of the posts 11 may be elevated to a greater height than its associated post 14 without distorting the relation between the axle 18 and its bearings. Thus the joist which forms the outside of the curve about which the conveyer is bent may be elevated to a greater height than the inside joist, thus placing the rollers 20—22, associated with the outside of the conveyer, at a greater height than those associated with the opposite side of the conveyer. Thus the conveyer is "banked" upon the curve to assist in retaining the parcels thereon, though they travel at relatively high speed about the curve. With the arrangement shown in Figure 10, the cross bar 15 should be omitted from connection between the posts 11 and 14 to permit relative variation in height between these members. However, the structure may be rendered more rigid by interposing a cross brace 44 between the legs 24 and 25 in addition to the usual cross brace 26 illustrated in Figures 6 and 7.

While I have illustrated and described the preferred embodiment of my invention, I do not desire to be limited to any of the details, except as shown in the appended claims.

I claim:

1. In a conveyer structure, a plurality of longitudinal joists, each of said joists being formed of a plurality of links interconnected to form a lazy tong, a supporting frame mounting said joists in spaced parallel relation to each other, each of said frames being connected to each of said joists at one of the points of the respective lazy tong, means adjustably securing the opposite point of said lazy tong to said support, and means for locking said other point to said support in any desired position.

2. In a flexible and extensible conveyer, a pair of longitudinal joists formed of a plurality of links formed of wide, flat strips pivotally interconnected to form a lazy tong, means mounting said joists in spaced parallel relation with the lazy tongs on edge, and a plurality of axles extending across said joists and journalled in the uppermost pivotal connections of said lazy tong links, and a disk roller on each end of each of said axles, said rollers having a diameter greater than the width of the ends of said links whereby the periphery of the rollers will extend above the ends of said links.

3. In a flexible and extensible conveyer, a pair of longitudinal joists formed of a plurality of links pivotally interconnected to form a lazy tong, means mounting said joists in spaced parallel relation with the lazy tongs on edge, and a set of parcel supporting rollers for each side of said conveyer, one journalled respectively in each of the uppermost pivotal connections of said lazy tong links, the roller at one of said connections being on one side of said lazy tong, and the roller at the next connection being on the opposite side of said lazy tong.

HERBERT E. TWOMLEY.